(12) United States Patent
Nakazawa et al.

(10) Patent No.: US 11,125,720 B2
(45) Date of Patent: Sep. 21, 2021

(54) CAPILLARY ELECTROPHORESIS APPARATUS

(71) Applicant: Hitachi High-Tech Corporation, Tokyo (JP)

(72) Inventors: Taro Nakazawa, Tokyo (JP); Motohiro Yamazaki, Tokyo (JP); Kenko Uchida, Tokyo (JP); Akira Fujii, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 150 days.

(21) Appl. No.: 16/083,780

(22) PCT Filed: Mar. 18, 2016

(86) PCT No.: PCT/JP2016/058661
§ 371 (c)(1),
(2) Date: Sep. 10, 2018

(87) PCT Pub. No.: WO2017/158811
PCT Pub. Date: Sep. 21, 2017

(65) Prior Publication Data
US 2019/0041359 A1 Feb. 7, 2019

(51) Int. Cl.
*G01N 27/447* (2006.01)
(52) U.S. Cl.
CPC . *G01N 27/44791* (2013.01); *G01N 27/44704* (2013.01); *G01N 27/44713* (2013.01)
(58) Field of Classification Search
CPC ....... G01N 27/44756; G01N 27/44791; G01N 27/44704
See application file for complete search history.

(56) References Cited

U.S. PATENT DOCUMENTS

| 5,240,585 A | 8/1993 | Young et al. |
| 5,322,607 A | 6/1994 | Baer et al. |

(Continued)

FOREIGN PATENT DOCUMENTS

| JP | 6-160352 A | 6/1994 |
| JP | 2001-99813 A | 4/2001 |

(Continued)

OTHER PUBLICATIONS

International Search Report (PCT/ISA/210) issued in PCT Application No. PCT/JP2016/058661 dated May 10, 2016 with English translation (two (2) pages).

(Continued)

*Primary Examiner* — Luan V Van
*Assistant Examiner* — Caitlyn Mingyun Sun
(74) *Attorney, Agent, or Firm* — Crowell & Moring LLP

(57) ABSTRACT

A capillary electrophoresis apparatus is disclosed that does not discharge and achieves both compactness and performance even with a part configuration having insufficient spatial distance or creeping distance. This capillary electrophoresis apparatus is provided with a resistance heater for heating capillaries, an electrode holder that holds capillary electrodes and is connected to a high-voltage unit, and a conductive member that at least partially comprises metal and has been grounded to a low potential. The electrode holder and conductive member are in contact with heat-dissipating rubber disposed there between that composes a structure comprising an insulation member. As a result of this configuration, discharge risk is reduced through the reduction of the potential of parts near the high-voltage unit and the slow reduction of the high potential of the high-voltage unit.

10 Claims, 14 Drawing Sheets

(56) References Cited

U.S. PATENT DOCUMENTS

| | | | |
|---|---|---|---|
| 7,958,736 B2* | 6/2011 | Banerji | ..................... B01L 7/52 62/3.2 |
| 2006/0000714 A1* | 1/2006 | Kojima | ............ G01N 27/44704 204/601 |
| 2006/0219559 A1 | 10/2006 | Ugai et al. | |
| 2009/0020429 A1 | 1/2009 | Ozawa et al. | |
| 2012/0043211 A1 | 2/2012 | Otsuka et al. | |

FOREIGN PATENT DOCUMENTS

| | | | |
|---|---|---|---|
| JP | 2001-165904 A | 6/2001 |
| JP | 2006-177921 A | 7/2006 |
| JP | 2006-284530 A | 10/2006 |
| JP | 2007-171216 A | 7/2007 |
| JP | 2009-42226 A | 2/2009 |
| JP | 2010-249579 A | 11/2010 |
| JP | 2011-68970 A | 4/2011 |
| JP | 2011-112375 A | 6/2011 |

OTHER PUBLICATIONS

Japanese-language Written Opinion (PCT/ISA/237) issued in PCT Application No. PCT/JP2016/058661 dated May 10, 2016 (three (3) pages).

Japanese-language Office Action issued in Japanese Application No. 2019-224288 dated Nov. 4, 2020 with English translation (nine (9) pages).

* cited by examiner

[FIG. 1]
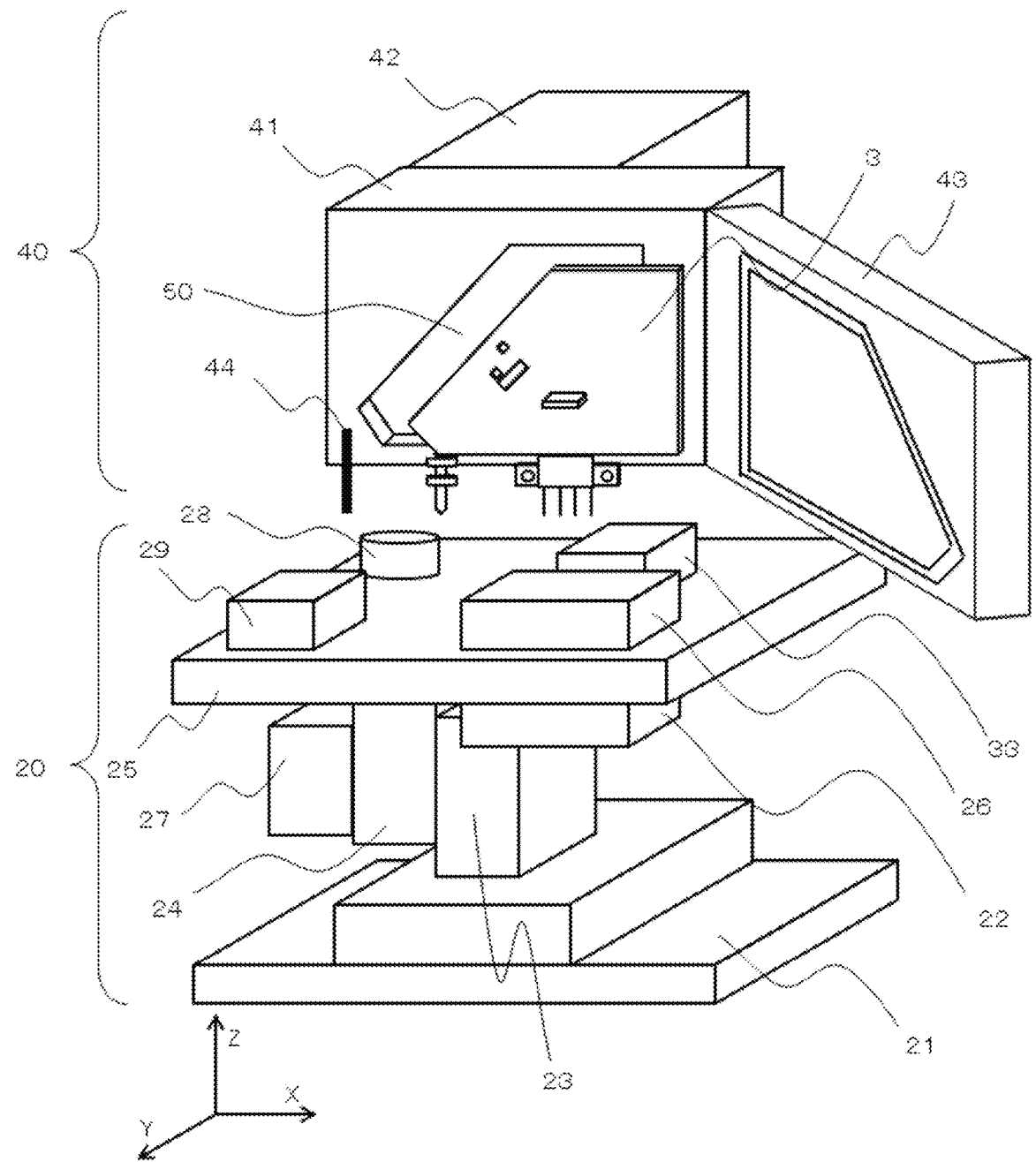

[FIG. 2]
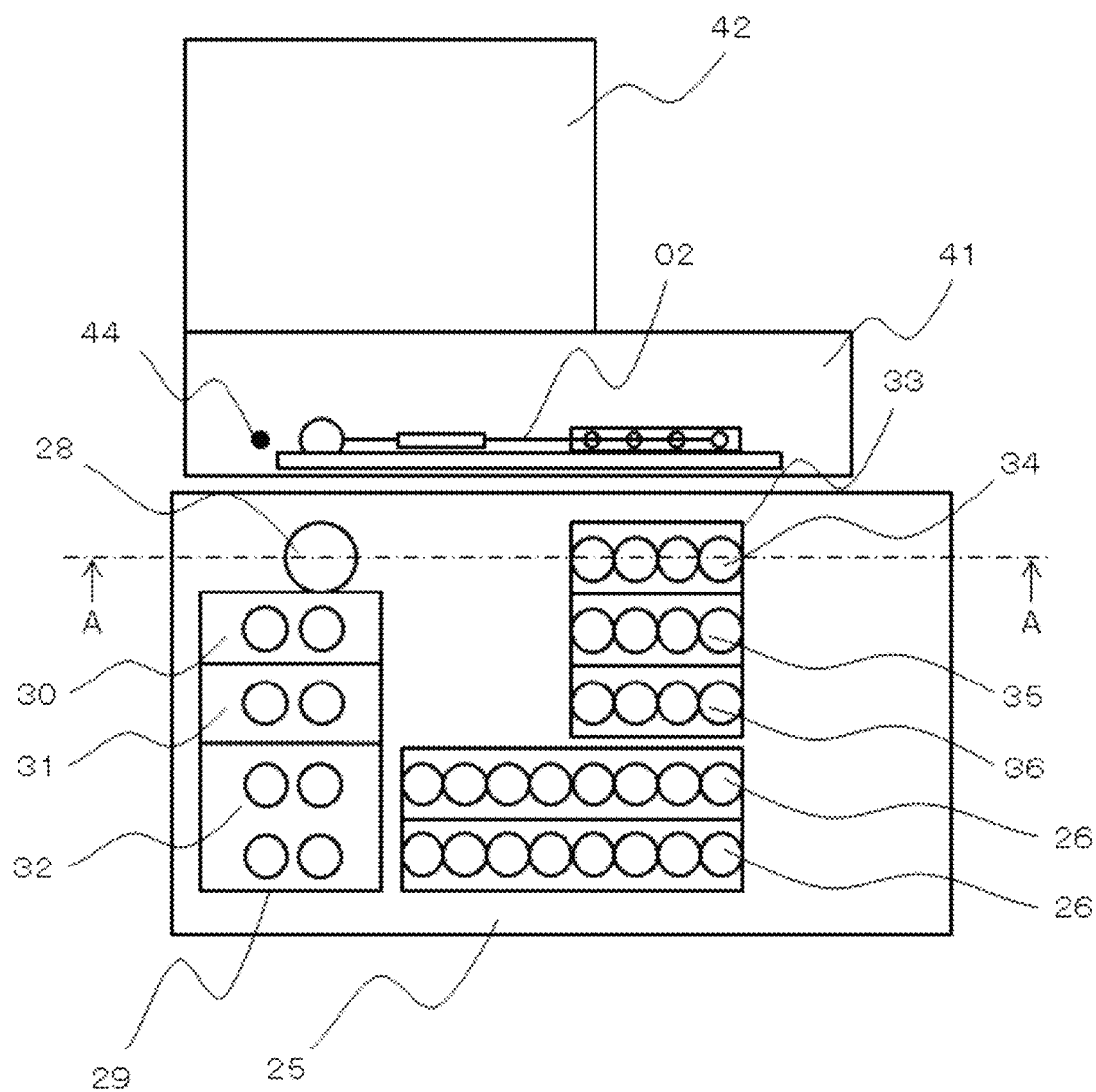

[FIG. 3]
A-A
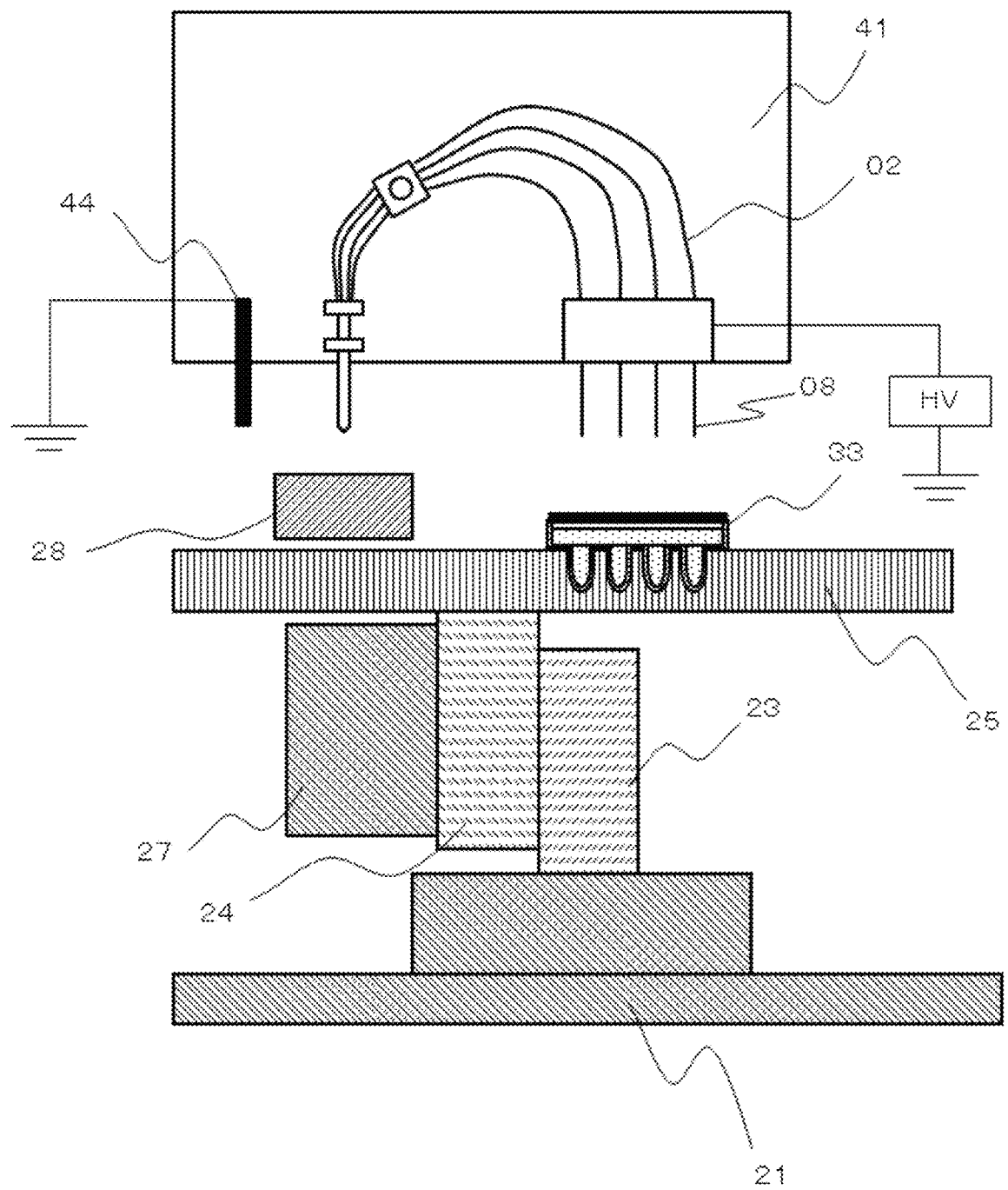

[FIG. 4]
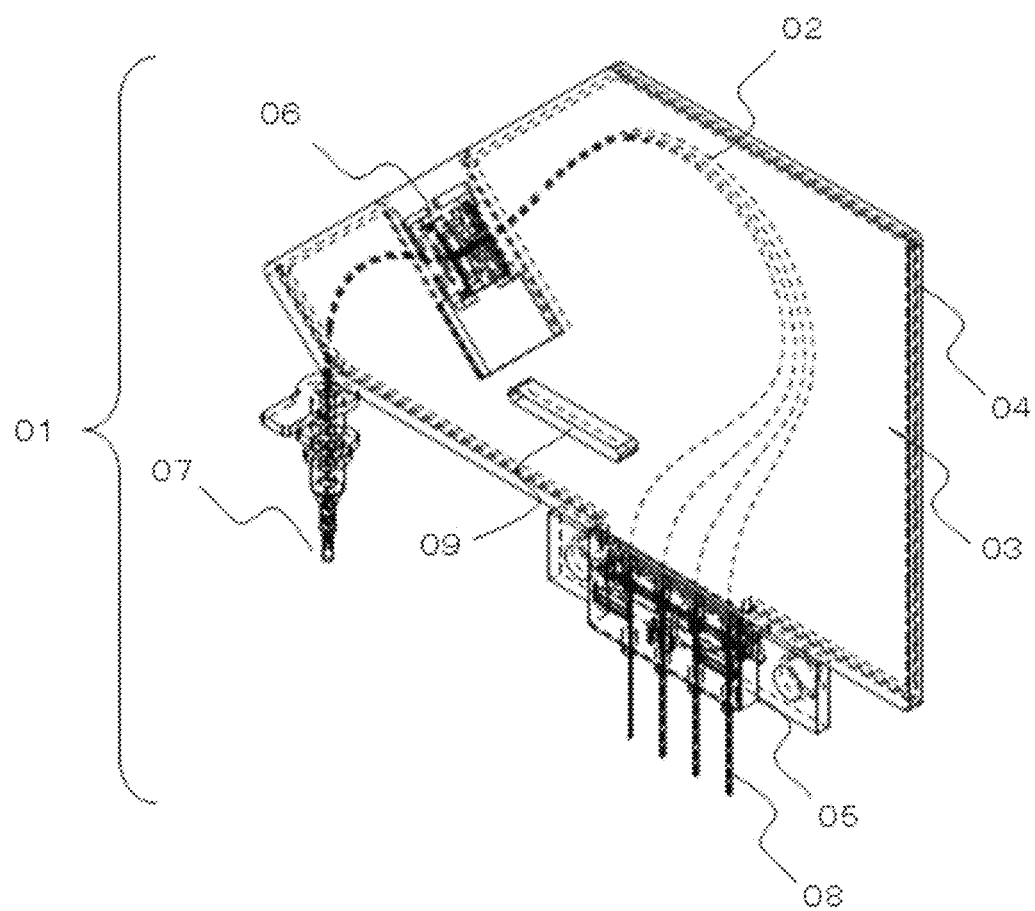

[FIG. 5]
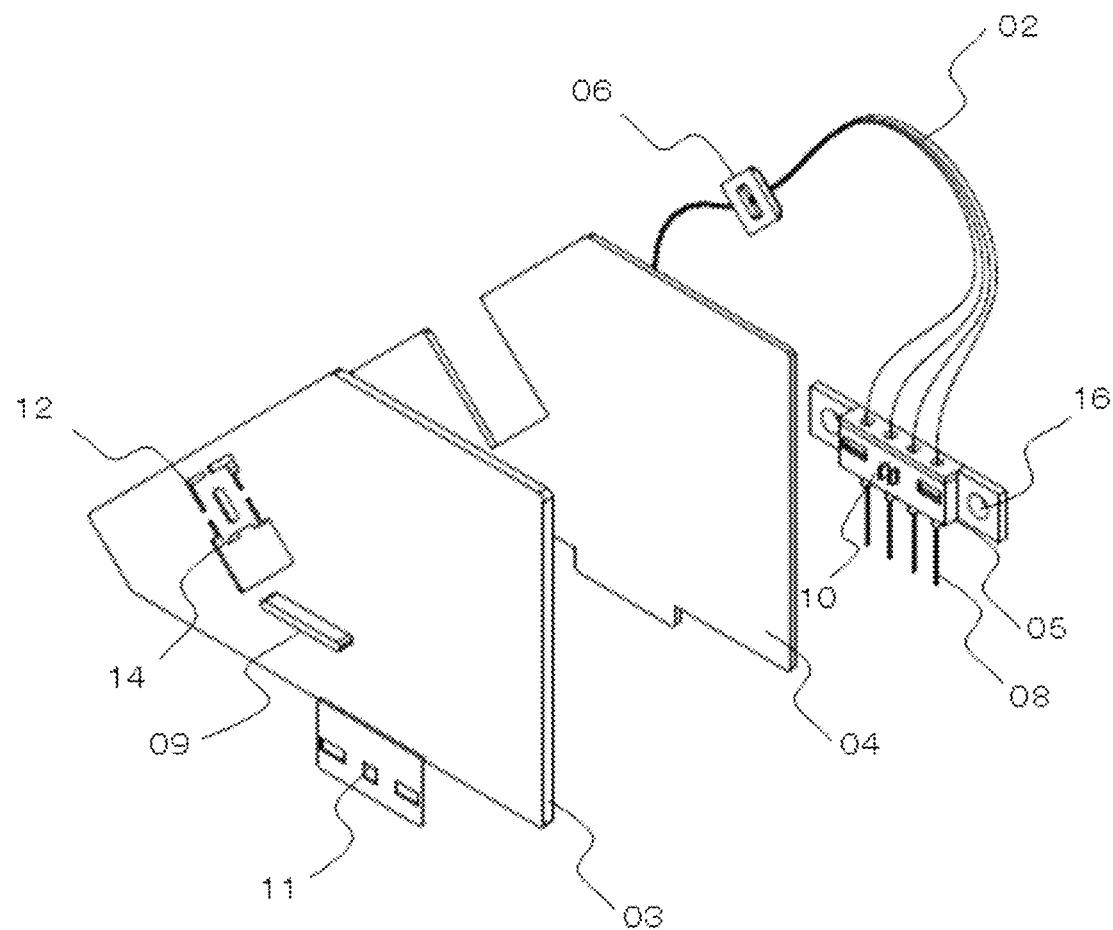

[FIG. 6]
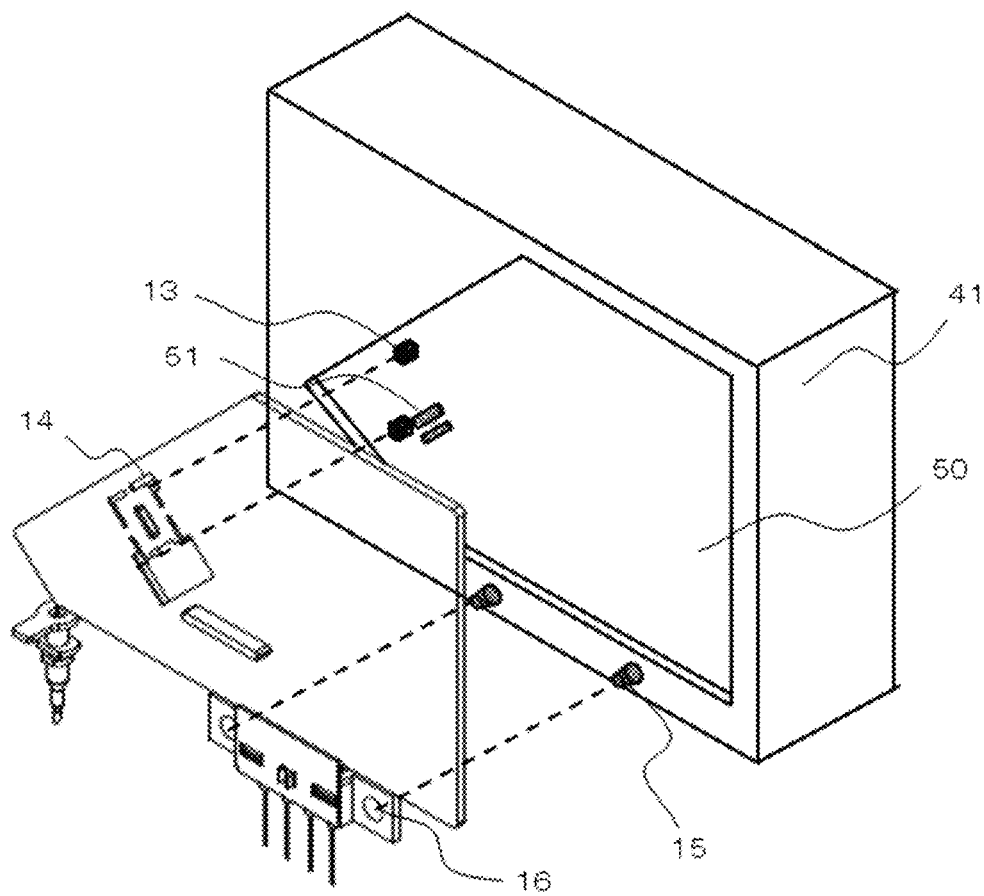
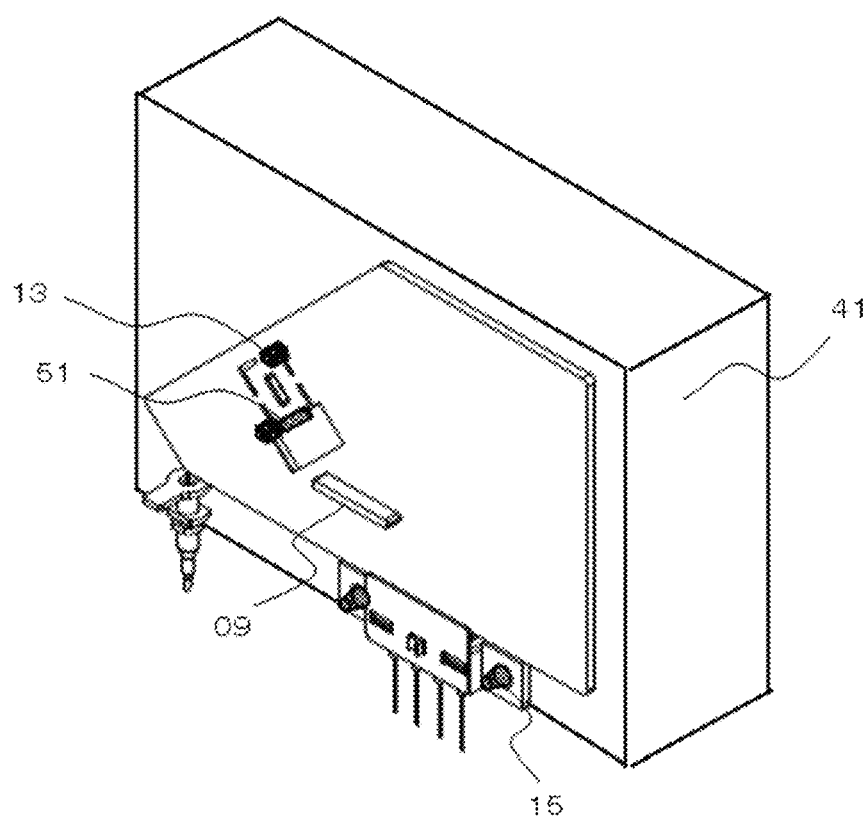

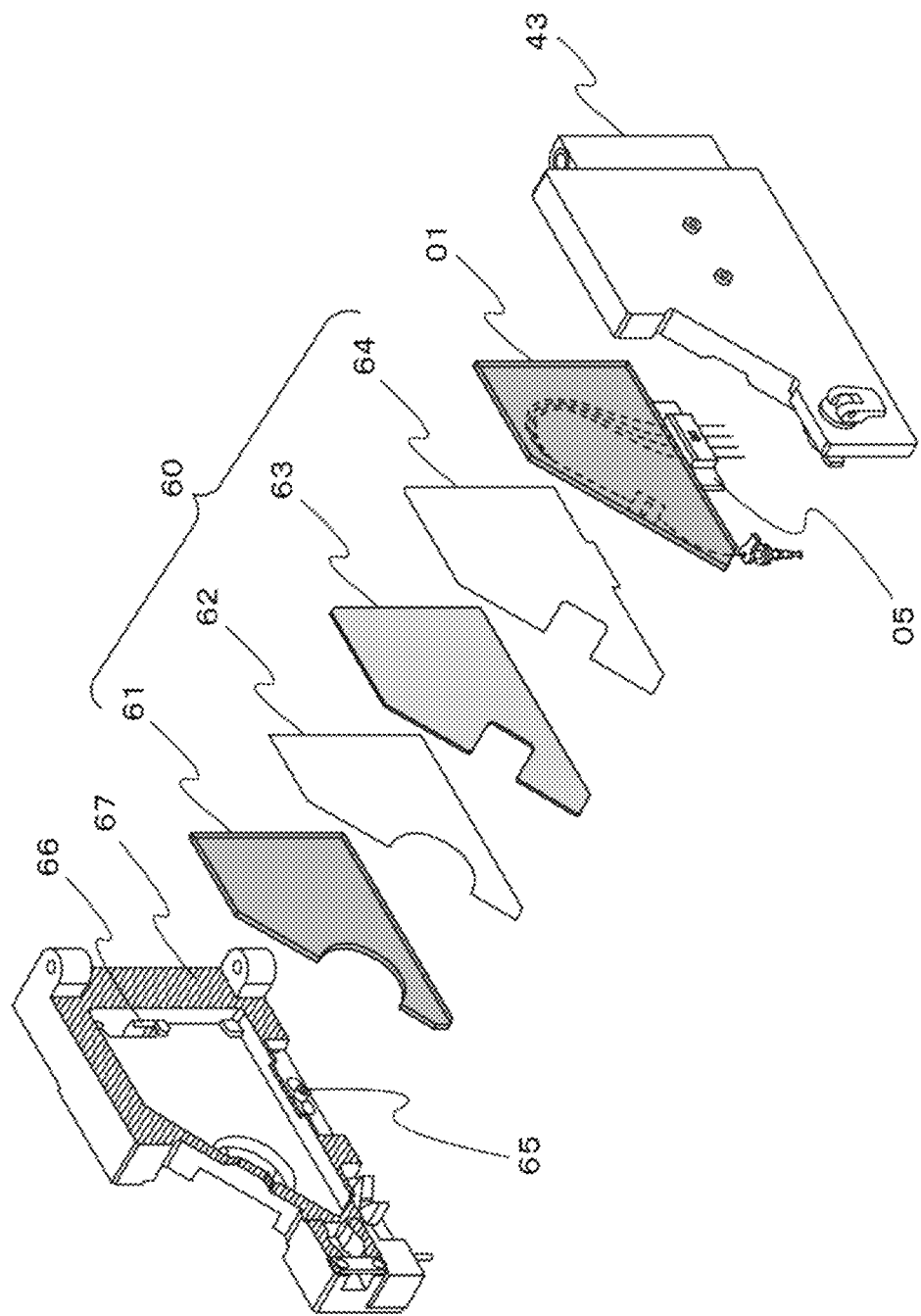
[FIG. 7]

[FIG. 8]
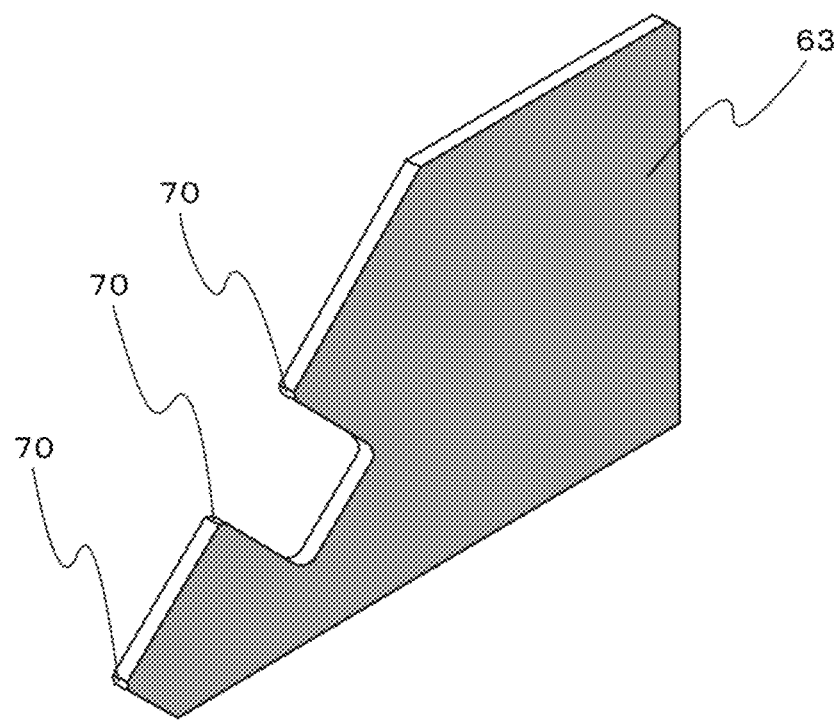
[FIG. 9]
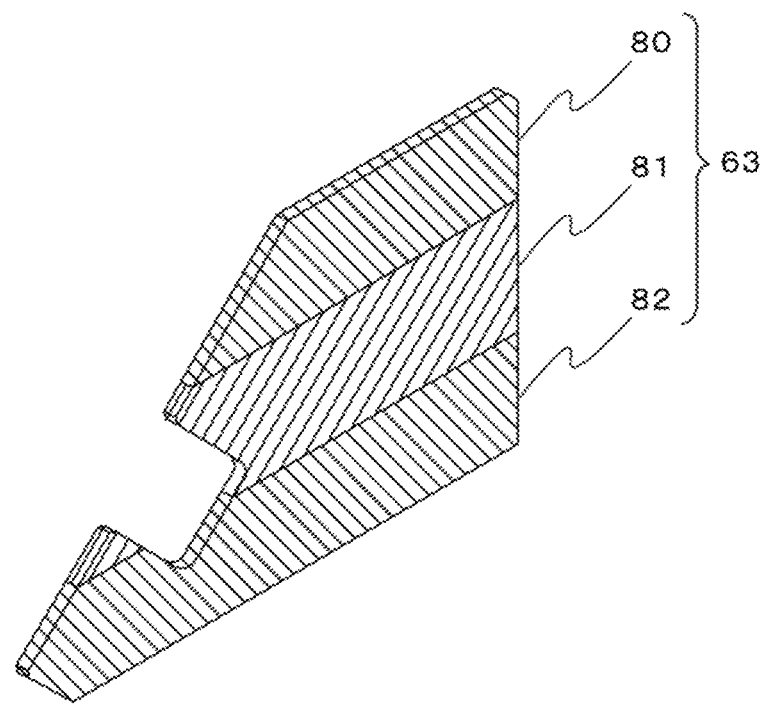

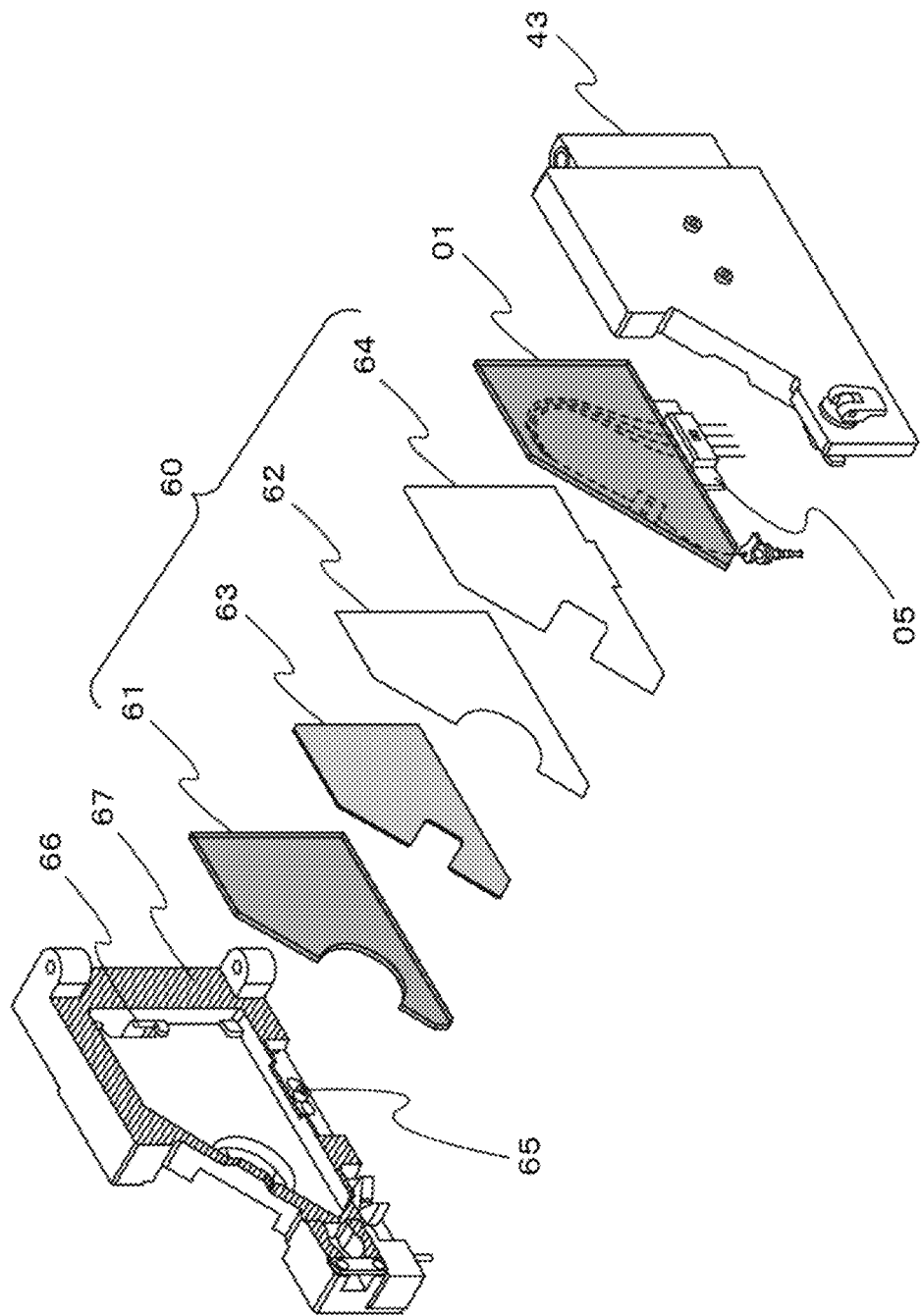
[FIG. 10]

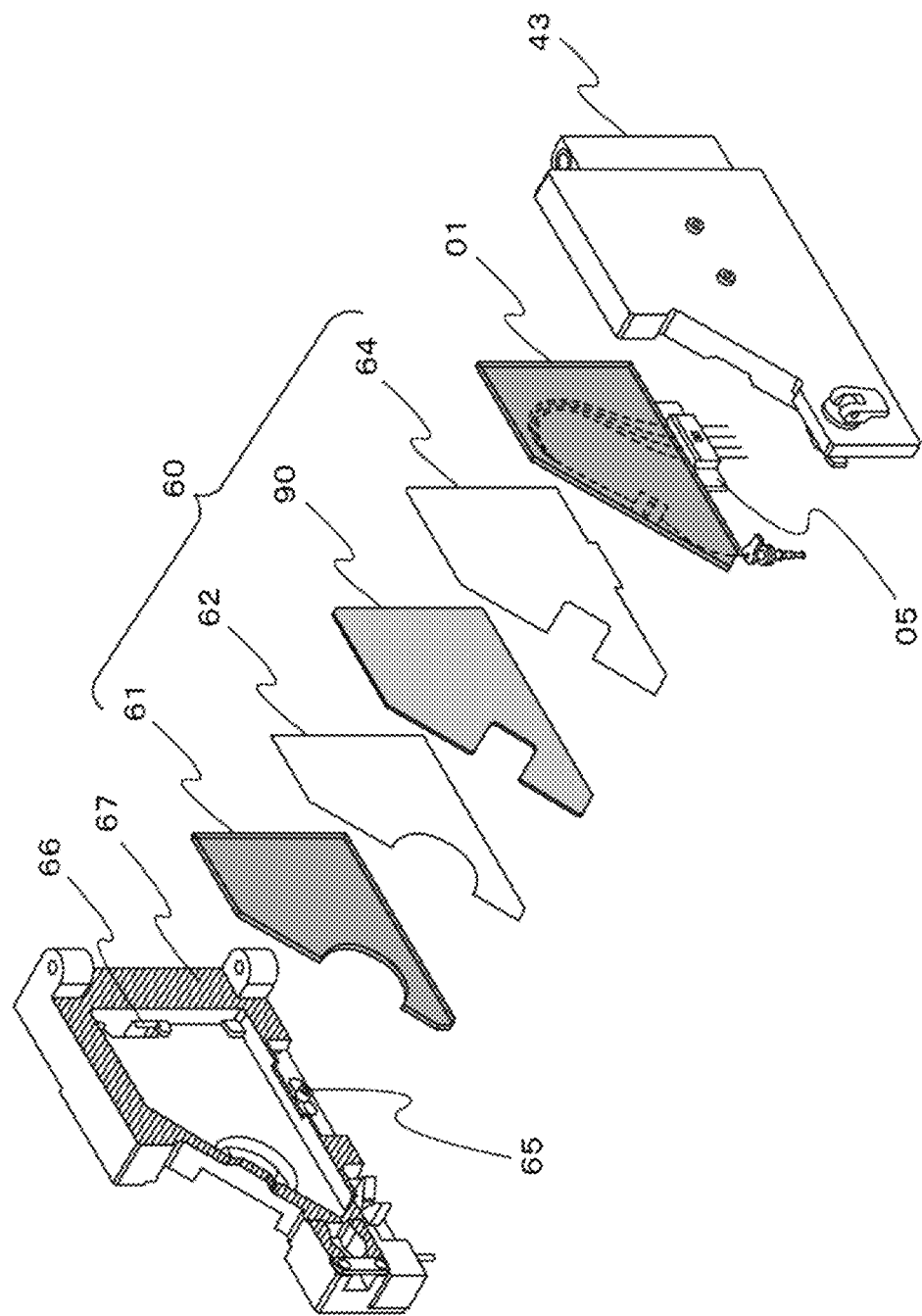
[FIG. 11]

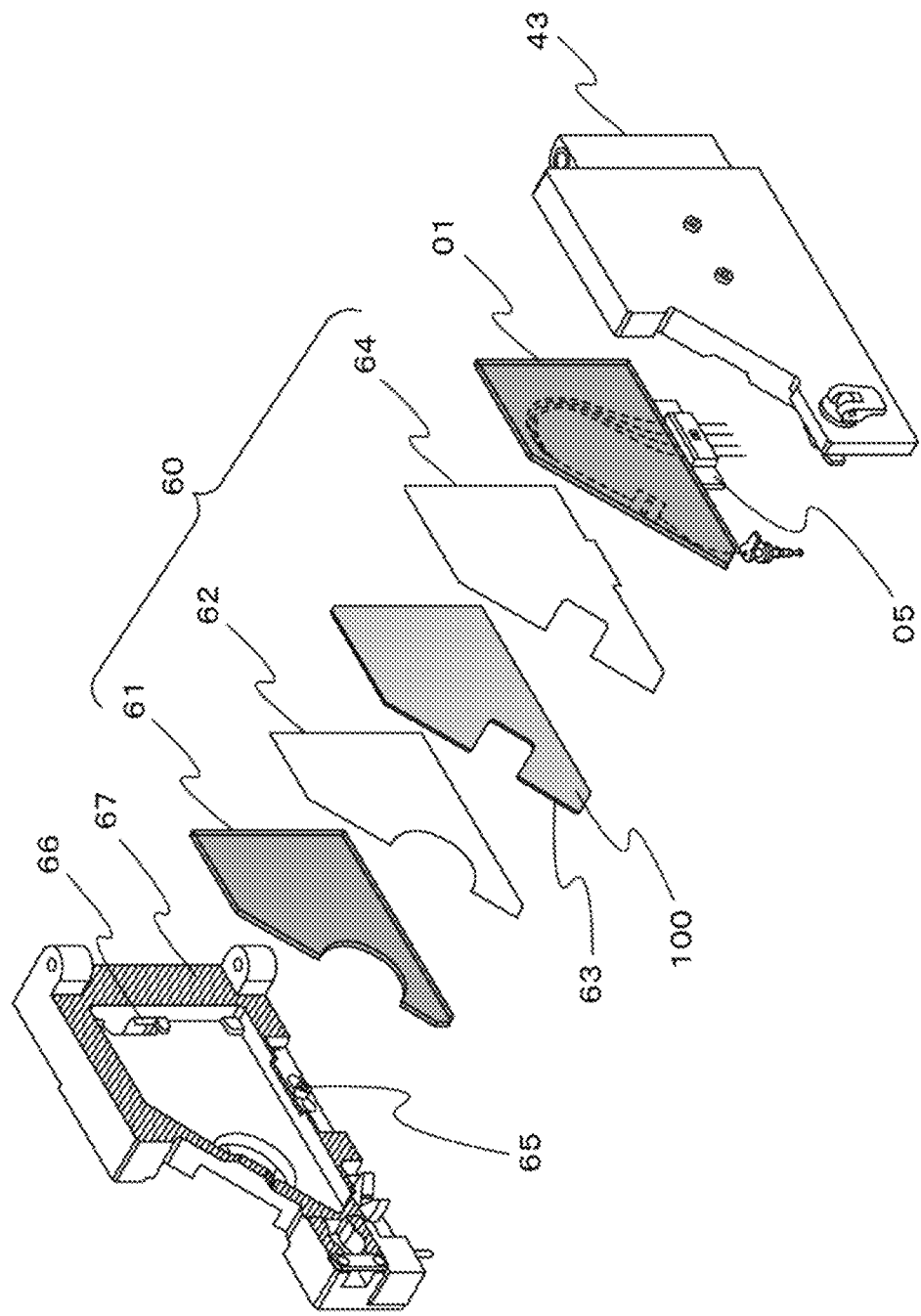
[FIG. 12]

[FIG. 13]
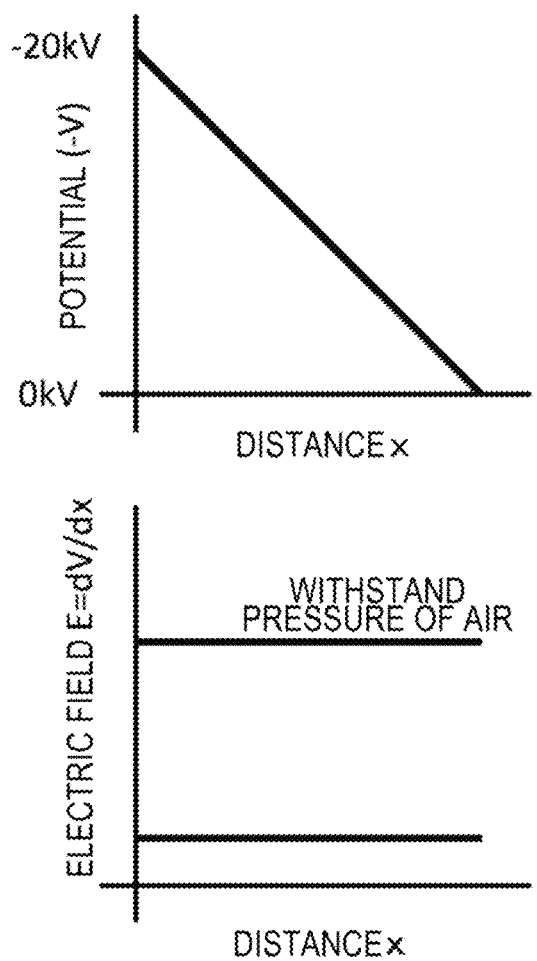

[FIG. 14]
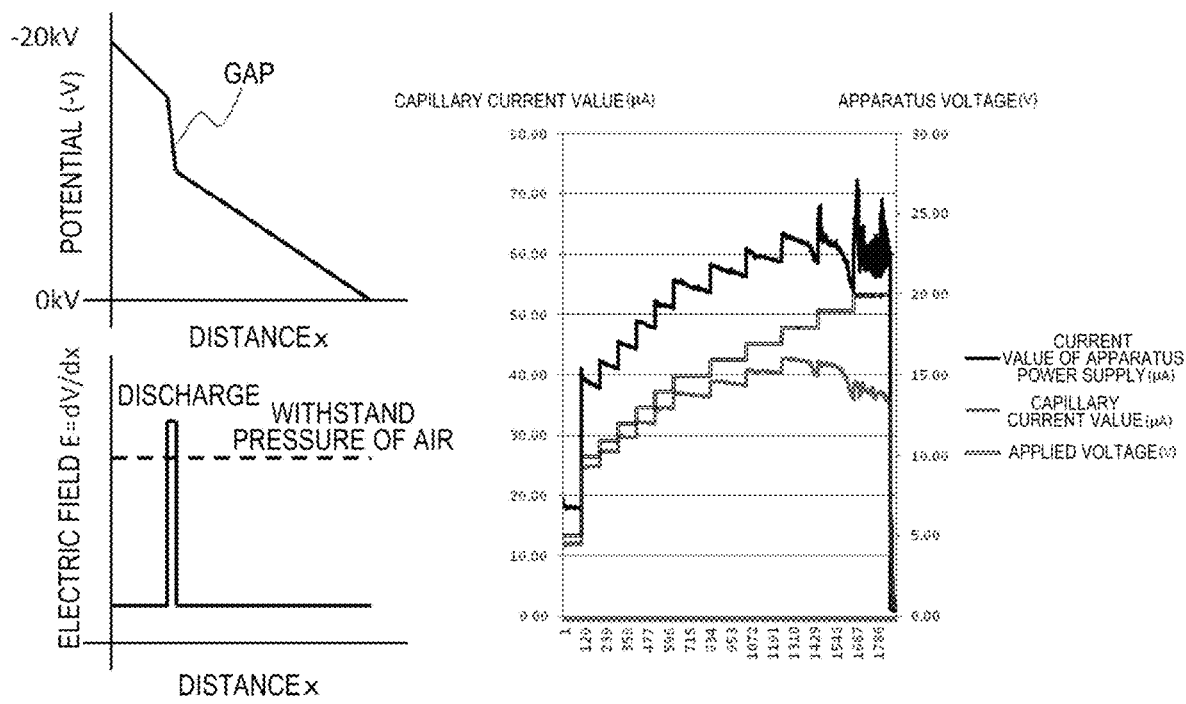
[FIG. 15]
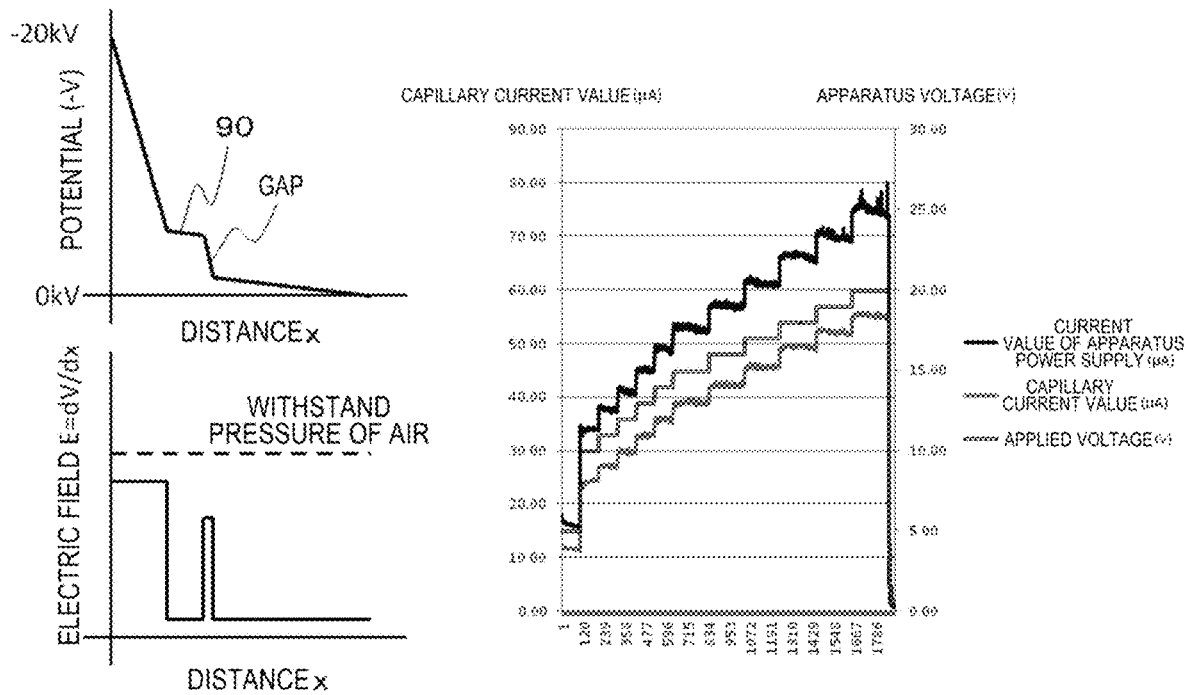

[FIG. 16]
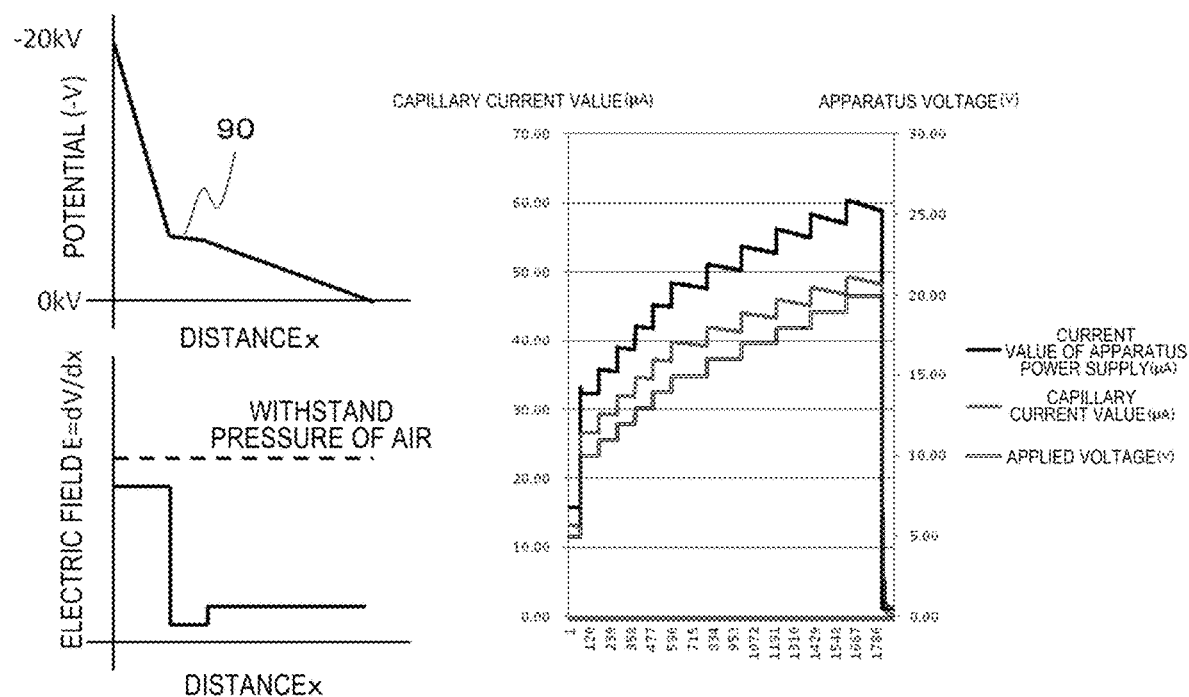

CAPILLARY ELECTROPHORESIS APPARATUS

TECHNICAL FIELD

The present invention relates to an electrophoresis apparatus using a capillary and particularly to a technique of reducing the size thereof and reducing discharge risk.

BACKGROUND ART

In recent years, DNA analysis has been rapidly widely applied in a range from a research application to a clinical field such as a hospital. There is a method of separating a DNA fragment of a sample by electrophoresis as a means of the DNA analysis, and the method is used for a criminal investigation, judgement of a blood relationship, and disease diagnosis.

In capillary electrophoresis, a capillary filled with a separation medium is maintained at a constant temperature and a high voltage is applied, and thereby, charged DNA is separated for each base length. A capillary is irradiated with excitation light and fluorescence emitted from the fluorescent dye label of DNA passing through the capillary is detected, and thereby, the base sequence of the sample can be read.

In recent years, along with the diversification of various users, demands have also diversified. One demand is to reduce the size of an apparatus and another is to obtain the result of DNA analysis as soon as possible.

Regarding the size reduction of an apparatus, it is considered to actively eliminate an extra space in the apparatus to reduce the size of the apparatus itself. In a case where a conductive part having a potential difference exists near a cathode end of a capillary, there is a possibility that discharge may occur in peripheral parts other than the capillary. A capillary electrophoresis apparatus of the related art has been designed so as not to arrange a conductive part near a cathode end of a capillary in order to avoid discharge. However, if the size of the apparatus is reduced, the conductive part is inevitably arranged near the cathode end of the capillary, and thus a possibility of discharge increases.

This is a problem which is also covered in PTL 1, and PTL 1 discloses a structure in which, even in a case where a conductive part is arranged near a cathode end of a capillary, a spatial distance or creeping distance from the electrode of the capillary to the conductive part increases.

Incidentally, regarding accomplishment of fast DNA analysis, a method of shortening the time required to start electrophoresis and a method of increasing an electrophoretic speed itself are considered. PTL 2 discloses an electrophoresis apparatus including a capillary, a support body in which the capillary is arranged on a surface, a heater for temperature control which is in direct contact with the capillary, an optical system, and a high voltage power supply. Due to the structure in which the capillary is directly brought into contact with the heater, the time required for increasing the temperature to a predetermined temperature at the time of electrophoretic analysis can be shortened.

PTL 2 is an effective means of quickly obtaining the analysis result by shortening the time required to start capillary electrophoresis. In addition, as a method for quickly obtaining the analysis result by accomplishing fast capillary electrophoresis, for example, there is a method of applying a high voltage to a capillary. However, in a case where a high voltage is applied, the above-mentioned potential difference is further increased and there is a possibility that discharge may occur in peripheral parts other than the capillary.

CITATION LIST

Patent Literature

PTL 1: JP-A-2010-249579
PTL 2: JP-A-2006-284530

SUMMARY OF INVENTION

Technical Problem

As described above, when demands for reducing the size of a capillary electrophoresis apparatus and accomplishing fast DNA analysis are realized, a problem common to both is to make a countermeasure against discharge phenomenon. In a case where a high voltage is applied to a capillary, discharge risk to peripheral parts also increases. In order to reduce the discharge risk, a long spatial distance or a long creeping distance from the electrode of the capillary to the peripheral conductive part has to be secured, but by simply securing a distance, the internal capacity of the apparatus is increased by the extent, which is contrary to the size reduction of the apparatus.

As a method of securing a long creeping distance, a method of processing parts corresponding to the creeping distance into complicated shapes to increase the surface area is commonly used. It is a method to increase a creeping distance by applying roughness to places where simple surface shapes are enough. However, discharge risk increases or decreases depending on the presence or absence of cutting marks, molding marks, or the like on the surface of the parts, and the state of the atmosphere temperature and humidity inside the apparatus. Due to a phenomenon called tracking, the place where discharge occurred once functions as a discharge path and becomes a state in which discharge is likely to recur. Thus, it is difficult to take countermeasures for discharge only by complicating constitutional parts.

In addition, other than simply securing a distance, a method of achieving insulation by blocking a space is used. In a case where the electrode of a capillary is attached while being spatially blocked off from the outside, it is easy to block off a space including a high voltage unit. However, since the capillary is a component that is consumable and has to be exchanged after performing a certain number of times of electrophoresis, the capillary electrode also has to be present in a space accessible to a user for exchange, and it is also difficult to perform spatial blocking.

An object of the present invention is to solve the above problems and to provide a capillary electrophoresis apparatus that reduces discharge risk even with a part configuration having an insufficient spatial distance or creeping distance.

Solution to Problem

In order to achieve the above object, in the present invention, there is provided a capillary electrophoresis apparatus for analyzing a sample by electrophoresis using a capillary, the apparatus including: a heater that heats the capillary; an electrode holder that holds capillary electrodes of the capillary and is connected to a high-voltage unit; and a conductive member that is at least partially formed of metal and is grounded to a low potential, in which the electrode holder and the conductive member are in contact with a structure disposed therebetween, and the structure is an insulation member.

Advantageous Effects of Invention

According to the present invention, it is possible to provide a capillary electrophoresis apparatus that reduces discharge risk even with a part configuration having an insufficient spatial distance or creeping distance.

BRIEF DESCRIPTION OF DRAWINGS

FIG. 1 is a schematic view illustrating a configuration of a capillary electrophoresis apparatus according to each embodiment.

FIG. 2 is a top view of the capillary electrophoresis apparatus in FIG. 1.

FIG. 3 is a cross-sectional view of the apparatus taken along a line A-A in FIG. 2.

FIG. 4 is a view illustrating a configuration of a capillary cartridge according to a first embodiment.

FIG. 5 is an exploded view of the capillary cartridge according to the first embodiment.

FIG. 6 is a schematic view of attachment of the capillary cartridge according to the first embodiment.

FIG. 7 is a view illustrating a configuration near the capillary in which discharge risk is reduced according to the first embodiment.

FIG. 8 is a view illustrating one example of a shape of a conductive member according to the first embodiment.

FIG. 9 is a configuration view for illustrating insulation treatment for the conductive member according to the first embodiment.

FIG. 10 is a view illustrating a configuration near a capillary in which discharge risk is reduced according to a second embodiment.

FIG. 11 is a view illustrating a configuration near a capillary in which discharge risk is reduced according to a third embodiment.

FIG. 12 is a view illustrating a configuration near a capillary in which discharge risk is reduced according to a fourth embodiment.

FIG. 13 is a view illustrating Graph 1 for illustrating the effect of the configuration of the third embodiment.

FIG. 14 is a view illustrating Graph 2 for illustrating the effect of the configuration of the third embodiment.

FIG. 15 is a view illustrating Graph 3 for illustrating the effect of the configuration of the third embodiment.

FIG. 16 is a view illustrating Graph 4 for illustrating the effect of the configuration of the third embodiment.

DESCRIPTION OF EMBODIMENTS

Hereinafter, various embodiments of the present invention will be described with reference to the drawings. In all the drawings illustrating various embodiments, those having the same function are denoted by the same reference numerals or symbols.

First Embodiment

A first embodiment is an embodiment of a capillary electrophoresis apparatus that reduces discharge risk even with a part configuration having an insufficient spatial distance or creeping distance. That is, the first embodiment is an embodiment of a capillary electrophoresis apparatus for analyzing a sample by electrophoresis using a capillary and includes a heater that heats the capillary, an electrode holder that holds capillary electrodes of the capillary and is connected to a high-voltage unit, and a conductive member that is at least partially formed of metal and is grounded to a low potential, in which the electrode holder and the conductive member are in contact with a structure disposed therebetween, and the structure is an insulation member. Hereinafter, the first embodiment will be described using FIGS. 1 to 9.

FIG. 1 illustrates a configuration example of a capillary electrophoresis apparatus according to the first embodiment. The apparatus can be roughly divided into two units: irradiation detection/thermostatic bath unit 40 at the top portion of the apparatus and an autosampler unit 20 at the bottom portion of the apparatus.

In the autosampler unit 20 which is an injection mechanism, a Y-axis drive body 23 is mounted on a sampler base 21 and can be driven on the Y axis. A Z-axis drive body 24 is mounted on the Y-axis drive body 23 and can be driven on the Z axis. A sample tray 25 is mounted on the Z-axis drive body 24, and a user sets an electrophoresis medium container 28, an anode side buffer liquid container 29, a cathode side buffer liquid container 33, and a sample container 26 on the sample tray 25. The sample container 26 is set on the X-axis drive body 22 mounted on the sample tray 25, and only the sample container 26 can be driven to the X axis on the sample tray 25. A liquid feeding mechanism 27 is also mounted on the Z-axis drive body 24. The liquid feeding mechanism 27 is arranged below the electrophoresis medium container 28.

The irradiation detection/thermostatic bath unit 40 includes a thermostatic bath unit 41, which is the thermostatic bath, and a thermostatic bath door 43, and can maintain an inside temperature at a constant temperature. An irradiation and detection unit 42 which is the irradiation detection portion is mounted behind the thermostatic bath unit 41, and can perform detection at the time of electrophoresis. A user sets a capillary cartridge which will be described in detail below in the thermostatic bath unit 41, the electrophoresis is performed while the capillary is maintained at a constant temperature in the thermostatic bath unit 41, and detection is performed by the irradiation and detection unit 42. In addition, an electrode (anode) 44 is also mounted on the thermostatic bath unit 41 so as to drop a high voltage to GND when the high voltage for electrophoresis is applied. The thermostatic bath unit 41 is provided with an attachment surface 50 of the capillary cartridge which will be described later.

As described above, the capillary cartridge is fixed to the thermostatic bath unit 41. The electrophoresis medium container 28, the anode side buffer liquid container 29, the cathode side buffer liquid container 33, and the sample container 26 can be driven to the Y and Z axes by the autosampler unit 20, and only the sample container 26 can be further driven to the X axis. The electrophoresis medium container 28, the anode side buffer liquid container 29, the cathode side buffer liquid container 33, and the sample container 26 can be automatically connected to an arbitrary position by movement of the autosampler unit 20, in the capillary of the fixed capillary cartridge.

FIG. 2 illustrates a view, which is viewed from the top of the capillary electrophoresis apparatus illustrated in FIG. 1. The anode side buffer liquid container 29 set on the sample tray 25 includes an anode side washing bath 30, an anode side electrophoresis buffer liquid bath 31, and an anode side sample introduction buffer liquid bath 32. In addition, the cathode side buffer liquid container 33 includes a waste liquid bath 34, a cathode side washing bath 35, and a cathode side electrophoresis buffer liquid bath 36.

The electrophoresis medium container 28, the anode side buffer liquid container 29, the cathode side buffer liquid container 33, and the sample container 26 are arranged in a positional relationship as illustrated in FIG. 2. Thus, a positional relationship of anode side and cathode side at the time of connection with a capillary 02 of the capillary cartridge in the thermostatic bath unit 41 becomes "electrophoresis medium container 28-waste liquid bath 34", "anode side washing bath 30-cathode side washing bath 35", "anode side electrophoresis buffer liquid bath 31-cathode side electrophoresis buffer liquid bath 36", and "anode side sample introduction buffer liquid bath 32-sample container 26".

FIG. 3 is a cross-sectional view of the capillary electrophoresis apparatus illustrated in FIG. 2 taken along a line A-A. The electrophoresis medium container 28 is set in the sample tray 25. In addition, the liquid feeding mechanism 27 is arranged such that a plunger embedded in the liquid feeding mechanism 27 is located below the electrophoresis medium container 28.

At the time of electrophoresis, the right side in FIG. 3 becomes a cathode side of the capillary 02, and the left side becomes an anode side. The autosampler unit 20 moves to a position of "anode side electrophoresis buffer liquid bath 31-cathode side electrophoresis buffer liquid bath 36" illustrated in FIG. 2, a high voltage is applied to the capillary 02 on an electrode (cathode) 08 side, and a current flows from the electrode (anode) 44 to GND through the cathode side buffer liquid container 33 and the anode side buffer liquid container 29, and thereby, electrophoresis is performed. An apparatus structure may be provided in which the position of the sample tray 25 is fixed and the irradiation detection/thermostatic bath unit 40 is operated.

FIG. 4 illustrates a schematic view of a configuration of the capillary cartridge according to the embodiment. The capillary cartridge 01 is configured to include the capillary 02, a support body 03, a heat dissipation body 04, an electrode holder 05, a exposure cell 06, a capillary head 07, the electrode (cathode) 08, and a grip 09 as a grip portion. In addition, the electrode (cathode) 08 may have a structure in which the electrode is directly fixed to the support body 03. In FIG. 4, the capillary cartridge 01 is arranged in the order of the support body 03 including the grip 09, the heat dissipation body 04, and the capillary 02 from the front side of FIG. 4.

The capillary head 07 is an end portion of the capillary 02 and is an injection end or a discharge end that holds the capillary 02 in a bundle and fills the electrophoresis medium. In the embodiment, when the capillary cartridge 01 is attached to the electrophoresis apparatus, the capillary head 07 is connected to a container in which the electrophoresis medium is stored, and thereby, the capillary head 07 functions as an injection end. The capillary head 07 is installed in a state of being bent in the electrophoresis apparatus.

FIG. 5 illustrates an exploded view of the capillary cartridge 01 in the embodiment illustrated in FIG. 4. The heat dissipation body 04 is attached to the support body 03 by the adhesiveness or tackiness of the heat dissipation body 04, chemical adhesion, a physical attachment mechanism, or the like. In addition, the capillary 02 has an integral structure by attaching the electrode holder 05 and the exposure cell 06 to the support body 03. The electrode holder 05 holds the electrode (cathode) 08 and has a structure in which an electrode holder fixing pin 10 formed in the electrode holder 05 passes through an electrode holder fixing hole 11 of the support body 03, thereby being fixed to the support body 03. In addition, the support body 03 includes a exposure cell fixing frame 12 for fixing the exposure cell 06, and the exposure cell 06 is fitted in the exposure cell fixing frame 12 formed in the support body 03, thereby being fixed to the support body 03.

The capillary 02 is a coated stagnant flow channel for maintaining light shielding and strength, and is, for example, a quartz glass tube that has an inner diameter of approximately 50 μm and is coated with polyimide. The tube is filled with an electrophoresis medium, thereby, becoming an electrophoresis path separating a sample. Since the capillary 02 and the heat dissipation body 04 are in close contact with each other, heat generated from the capillary 02 at the time of applying a high voltage can be released to the support body 03 side by the heat dissipation body 04, and a temperature inside the capillary 02 can be prevented from increasing.

The electrode (cathode) 08 exists in correspondence with the number of the capillaries 02, a charged sample can be introduced into the capillary 02 by applying a voltage, and thereby, electrophoresis separation can be performed for each molecular size. The electrode (cathode) 08 is a stainless steel pipe having an inner diameter of, for example, approximately 0.1 to 0.5 mm, and the capillary 02 is inserted therein.

The exposure cell 06 is positioned at an intermediate portion of the capillary 02, and the capillaries 02 are arranged in a planar manner with constant accuracy. The exposure cell 06 is a portion for detecting fluorescence of a sample passing through the capillary 02, and it is necessary to perform positioning with high accuracy with respect to the position of a detection system of the apparatus.

FIG. 6 illustrates an example of a detailed view of attachment of the capillary cartridge 01 according to the embodiment. In the upper part of FIG. 6, a state before the capillary cartridge is attached to the thermostatic bath unit is illustrated and in the lower part of FIG. 6, a state after the capillary cartridge is attached to the thermostatic bath unit 41 is illustrated. In a case where a exposure cell positioning pin 13 of the exposure cell 06 is attached to the attachment surface 50 on the thermostatic bath unit 41 side of the electrophoresis apparatus and is pushed through a positioning hole 14 of the support body 03, the exposure cell 06 is temporarily fixed by a clip 51. At the same time, since a taper-shaped electrode holder positioning pin 15 on the thermostatic bath unit 41 side of an apparatus for attachment is automatically inserted into an electrode holder positioning hole 16 of the support body 03, the capillary cartridge 01 is temporarily fixed to the thermostatic bath unit 41 by a one-time operation. The electrode holder positioning pin 15 and the electrode holder positioning hole 16 may be attached to opposite positions. That is, the electrode holder 05 and the support body 03 can be fixed by making the electrode holder positioning pin provided on one side pass through the electrode holder positioning hole provided on the other side.

FIG. 7 illustrates a configuration example near the capillary 02 in which discharge risk is reduced in the capillary electrophoresis apparatus according to the embodiment. A heater assembly 60 is attached to a thermostatic bath base 67. In FIG. 7, for easy understanding, the heater assembly 60 is separated from the thermostatic bath base 67. The same applies to the following.

The heater assembly 60 includes a thermal insulation material 61, a resistance heater 62, a conductive member 63, and a heat-dissipating rubber 64 constituting a structure formed of an insulation member, and these members are fixed to each other by a method such as bonding, welding, or screwing. In the embodiment, heat generated by the resistance heater 62 is transferred to the capillary 02 of the capillary cartridge 01 through the conductive member 63 and the heat-dissipating rubber 64 to heat the capillary 02. In addition, a thermal insulation material 61 is attached to the thermostatic bath base 67 side of the heater assembly 60 so that the heat of the resistance heater 62 is not dissipated.

It is desirable that the heat-dissipating rubber 64 has excellent thermal conductivity since it is necessary to effectively transfer the heat generated from the resistance heater 62 to the capillary 02. In addition, it is desirable that the heat-dissipating rubber is formed of a flexible material to avoid damage of the capillary 02 to be contacted.

The temperature control of the resistance heater 62 is performed with a temperature sensing sensor such as a thermistor attached to the heater assembly 60. The attachment position of the thermistor not illustrated in the drawing may be on any of the thermal insulation material 61, the resistance heater 62, the conductive member 63, and the heat-dissipating rubber 64, but is desirably on the heat-dissipating rubber 64.

A low potential portion is brought into contact with the conductive member 63. The low potential portion is generally referred to as earth or ground (GND), and has a virtual zero potential by being connected to the power supply of the apparatus. In the embodiment, as the low potential portion brought into contact with the conductive member 63, an earth plate 66 is attached to the thermostatic bath base 67. The earth plate 66 is grounded to the conductive member 63 while avoiding the surfaces of the thermal insulation material 61 and the resistance heater 62. As the shape of the low potential portion, it is acceptable to adopt a shape such as an earth wire or frame GND via a frame of the apparatus instead of the earth plate.

FIG. 8 illustrates a structure which is subjected to chamfering 70 as a specific example of the shape of the conductive member 63 in the embodiment. The conductive member 63 is a member that at least partially includes metal and has excellent conductivity. For example, one metal plate of aluminum, iron, brass, stainless steel, or the like is a preferable example. In addition, a resin plate in which a metal powder or metal filler is mixed, an elastomer, or the like may be used. Further, a metal surface, a metal sheet, a metal thin film, or the like, which is deposited on the resistance heater 62 and the heat-dissipating rubber 64 may be used.

The conductive member 63 also has a zero potential by being grounded to the earth plate 66 having a zero potential as described above. When the conductive member 63 has a zero potential, the effect of lowering the potential of peripheral parts and a function of determining the point where the potential drops with respect to a portion to which a high voltage is applied are attained, and thus any shape can be used as long as the effect and the function are achieved. In order to realize space saving, one preferable example is a single plate shape. However, in order to avoid electric field concentration, it is desirable to avoid an acute shape as much as possible and to reduce discharge risk by subjecting a portion having an edge to chamfering 70 or the like. The specific example in FIG. 8 is an example in which a plate shape formed along the shape of the heater assembly 60 is adopted and electric field concentration is avoided by performing chamfering 70.

FIG. 9 illustrates an example of a case where the conductive member 63 illustrated in FIG. 8 is subjected to insulation treatment. It is desirable that the conductive member 63 is insulated so that direct discharge does not occur with respect to the conductive member 63. For example, covering the entire conductive member 63 with a polyimide sheet, an insulating elastomer, a resin, or the like is one preferable example.

FIG. 9 illustrates a specific example of a design in which the thickness of the insulation member is changed in proportion to the distance from the high-voltage unit to perform the optimum insulation treatment. One insulation material 80 is wound around the upper portion of the conductive member 63 since the upper portion has the longest the distance from the high-voltage unit, two insulation materials 81 are wound around the intermediate portion thereof, and three insulation materials 82 are wound around the lower portion having the shortest distance from the high-voltage unit so that the lower portion is most thickened. An insulation material represented by a polyimide sheet is generally expensive and as the thickness thereof increases, the thermal conductivity decreases. Thus, it is possible to realize low costs and a function of preventing reduction in thermal conductivity by the configuration, compared to a case where the insulation material having an entirely uniform thickness is attached. In addition, instead of changing the number of windings of the insulation material, gradation may be applied to insulation performance and thermal conductivity of one insulation material. As long as reduction in cost and thermal conductivity is within an allowable range, it is needless to say that the insulation material having an entirely uniform thickness can be attached. However, in any of these cases, it is necessary to perform insulation treatment with a function of grounding the conductive member 63 to the earth plate 66. In addition, the contact surface of the thermostatic bath base 67 and the conductive member 63 may protrude so as to secure a sufficient creeping distance with the conductive member 63.

In the configuration of the embodiment, in a case where electrophoresis is started using the capillary electrophoresis apparatus in which the conductive member 63 illustrated in FIGS. 8 and 9 is included inside the thermostatic bath base 67 in FIG. 7, a high voltage is applied to the high-voltage unit in the electrode holder 05 through an electrode plug 65. A discharge phenomenon occurs due to the potential difference and thus discharge occurs with respect to the earth plate 66 or the conductive member 63 having a zero potential at this time. However, in the configuration of the embodiment, the conductive member 63 and the thermostatic bath base 67 are in contact with the lower side of the conductive member 63 and the thermostatic bath base 67 and the electrode holder 05 are in contact with each other so as to cover the electrode plug 65.

At this time, since the thermostatic bath base 67 and the electrode holder 05 are insulation members, the high-voltage unit and the low-voltage unit having a zero potential are in contact with a plurality of insulated structures disposed therebetween. Then, the potential from a portion to which a high voltage is applied to the conductive member 63 having a zero potential is gradually lowered using the thermostatic bath base 67 as a dielectric. The conductive member 63 ground to the earth plate 66 which is a low potential portion has a virtual zero potential in the apparatus as the earth plate 66. Generally, a high potential is generated at a portion to which a high voltage is applied and in the vicinity thereof. However, since the potential of parts positioned in the conductive member 63 and near the conductive member 63 having a zero potential is lowered, discharge does not occur in the high-voltage unit of the electrode plug 65 and the electrode holder 05 to parts other than the conductive member 63.

Here, as the structural size of the conductive member 63 increases, the potential of parts near the conductive member 63 is also easily lowered. For example, the fact that the area of the conductive member 63 is larger than the area of a member to which a high voltage is applied by the capillary electrode held by the electrode holder is one factor of enhancing the effect of preventing discharge to the vicinity.

Second Embodiment

A second embodiment is another embodiment of a capillary electrophoresis apparatus that reduces discharge risk even with a part configuration having an insufficient creeping distance or spatial distance.

As illustrated in FIG. 10, the same configurational members as in the first embodiment illustrated in FIG. 7 are provided, but the order of the conductive surface and the resistance heater 62 included in the heater assembly 60 is different. That is, the conductive member 63 is arranged adjacent to the thermal insulation material 61 and subsequently, the resistance heater 62 is arranged. This configuration is a configuration in which a distance between the conductive surface of the conductive member 63 and the thermostatic bath base 67 is reduced by switching the resistance heater 62 and the conductive surface of the conductive member 63, and the potential of the conductive surface of the conductive member 63 and the potential of the thermostatic bath base 67 are made to approximate more than when the resistance heater 62 is interposed therebetween. By adopting the configuration of the embodiment, it is possible to expect that the potential of the thermostatic bath base 67 and parts near the thermostatic bath base can be further lowered. In addition, an insulation countermeasure is applied to the conductive member 63 so that direct discharge does not occur with respect to the conductive member 63 as in the first embodiment.

As described in the first and second embodiments, in a case where the order of the constitutional parts for improving performance is changed, the shape may be changed according to the change.

Third Embodiment

A third embodiment is an embodiment of a configuration of a capillary electrophoresis apparatus that reduces discharge risk even with a part configuration having an insufficient creeping distance or spatial distance, and further has a heat insulation function. That is, the third embodiment is an embodiment of a capillary electrophoresis apparatus for analyzing a sample by electrophoresis using a capillary, and includes a heater that heats the capillary, an electrode holder that holds capillary electrodes and is connected to a high-voltage unit, and a conductive heat storage plate that is at least partially formed of metal and is grounded to a low potential, in which the electrode holder and the conductive heat storage plate are in contact with a structure which is an insulation member.

In the embodiment illustrated in FIG. 11, instead of using the conductive member 63 in the embodiment illustrated in FIG. 7, a conductive heat storage plate 90 is used to have a function of heat storage. The conductive heat storage plate 90 which is a conductive member is a member that at least partially includes metal and has excellent conductivity, and has a large thermal capacity. For example, one metal plate having a thickness of approximately 1.0 mm to 10.0 mm and formed of aluminum, iron, brass, or stainless steel is a preferable example from the viewpoint of conductivity and thermal capacity. In addition, out of a resin plate in which a metal powder or metal filler is mixed, and an elastomer, one having a large thermal capacity is preferable. An insulation countermeasure is applied so that direct discharge does not occur with respect to the conductive heat storage plate 90 as in the case of the conductive member 63 in the first embodiment. In addition, the conductive heat storage plate 90 and the electrode holder 05 are in contact with the heat-dissipating rubber 64 as a structure formed of an insulation member as in the first embodiment.

In the configuration of the embodiment using the conductive heat storage plate 90, for example, when the capillary cartridge 01 is exchanged, even in a case where a user opens or closes the thermostatic bath door 43, the effect of not easily decreasing the temperature is easily is obtained. This is because the conductive heat storage plate 90, which is a conductive member, has a function of decreasing discharge risk and a function of sufficiently storing heat generated from the resistance heater 62 due to a large thermal capacity.

The effect of the embodiment will be described with reference to FIGS. 13 to 16 with actual verification results based on the configuration of the embodiment.

First, FIG. 13 is a graph illustrating one ideal state in which there is no floating metal around the electrode holder 05 which is a portion to which a high voltage is applied and all insulated structures with which the electrode holder 05 is brought into contact function as dielectrics. The horizontal axis shows a distance and the vertical axis shows a potential, and the distance x of the position of the electrode holder 05 to which −20 kV is applied is taken as zero. At this time, as illustrated in the upper part of the drawing, the potential gradually drops from −20 kV to 0 kV, and discharge does not occur at all.

On the right side of FIG. 14, the result when electrophoresis test is performed after the conductive heat storage plate 90 is eliminated from the configuration near the capillary of the embodiment in FIG. 11 is illustrated. As illustrated in the graph, while the voltage applied to the apparatus is applied stepwise from 0 kV to −20 kV, both the current value of the apparatus power supply and the capillary current value significantly fluctuate. Discharge greatly occurs near 18 kV from the apparatus power supply and from the capillary. This is because in a gap of approximately 10 mm formed due to absence of the conductive heat storage plate 90 inside, discharge occurs from the electrode holder 05 which is a portion to which a high voltage is applied.

On the left side in FIG. 14, an example of predicting the phenomenon occurred at this time from the viewpoint of potential and electric field is illustrated. Since electric field concentration occurs through the gap and the electric field surpasses the voltage resistance of air, discharge occurs. At this time, the potential is rapidly lowered.

Next, on the right side in FIG. 15, the result at the time of conducting electrophoresis test in a state in which the conductive heat storage plate 90 and the electrode holder 05 are provided and a gap of 1 mm or less is provided between the insulated structure disposed between the conductive heat storage plate and the electrode holder and the conductive heat storage plate 90 is illustrated. Compared to FIG. 14, while extreme fluctuations in the current value do not occur, instead, minute fluctuations in the current value occur intermittently even under a low voltage environment and when voltages of −19 kV and −20 kV are applied, significant fluctuations in the current value occur.

On the left side in FIG. 15, an example of predicting the phenomenon occurred at this time from the viewpoint of potential and electric field is illustrated. Since the conductive heat storage plate 90 has a zero potential, the potential drops toward the conductive heat storage plate, but discharge does occurs due to insulation. In addition, electric field concentration occurs in a small gap of 1 mm or less, but a significant discharge phenomenon does not occur. However, the gap of 1 mm or less is smaller than the gap in the example illustrated in FIG. 14, and thus intermittent fluctuations in the current value occur. In addition, when a high voltage of −19 kV or higher is applied, eventually, discharge occurs.

Finally, on the right side in FIG. 16, the result at the time of conducting electrophoresis test with the structure of the embodiment is illustrated. The gap provided in FIG. 15 is eliminated and the conductive heat storage plate 90 and the electrode holder 05 are in continuous contact with a single insulated structure or a plurality of insulated structures disposed therebetween without a gap. Almost no fluctuation in the current value is observed in both the apparatus power supply and the capillary.

On the left side in FIG. 16, an example of predicting the phenomenon at this time from the viewpoint of potential and electric field is illustrated. Since the conductive heat storage plate 90 has a zero potential, the potential drops toward the conductive heat storage plate, but discharge does not occur due to insulation. In addition, since no gap is provided, the structure, which is an insulation member, functions as a dielectric beyond the conductive heat storage plate 90 and the potential is gradually lowered.

Fourth Embodiment

A fourth embodiment is an embodiment of another configuration of a capillary electrophoresis apparatus that reduces discharge risk even with a part configuration having an insufficient creeping distance or spatial distance and further has a heat insulation function. That is, the fourth embodiment is an embodiment of a capillary electrophoresis apparatus including a heater that heats a capillary, a non-conductive heat storage plate, an electrode holder that holds capillary electrodes of the capillary and is connected to a high-voltage unit, and a conductive member that is at least partially formed of metal and is grounded to a low potential, in which the electrode holder and the conductive member are in contact with structures disposed therebetween, and the structures are insulation members.

As illustrated in FIG. 12, the conductive heat storage plate 90 having a heat storage function in the structure illustrated in FIG. 11 is changed to a non-conductive heat storage plate 100, and further, the conductive member 63 is attached thereto as a conductive surface. As the non-conductive heat storage plate 100, for example, it is preferable to use one non-conductive heat storage plate having a thickness of approximately 1.0 mm to 10.0 mm and formed of alumina or a glass plate from the viewpoint of thermal capacity. Examples of the conductive member 63 to be attached to the non-conductive heat storage plate 100 include one metal plate of aluminum, iron, brass, stainless steel, or the like, a resin plate in which a metal powder or a metal filler is mixed, an elastomer, and a deposited metal surface or metal sheet, and metal thin film, which are mentioned in the above example. Also, in the embodiment, it is desirable that the conductive member 63 is insulated so that direct discharge does not occur in the conductive member 63.

In addition, in FIG. 12, the conductive surface of the conductive member 63 is interposed between the resistance heater 62 and the non-conductive heat storage plate 100. However, it is desirable that the conductive member 63 is attached to a non-conductive heater formed by combining the resistance heater 62 and the conductive heat storage plate 90, for example, a heater generally referred to as a ceramic heater or glass heater and is insulated so that direct discharge does not occur.

According to the present invention described above, it can be thought that the conductive member that is grounded to a low potential generally referred to as earth or ground and is at least partially formed of metal has an almost zero potential. In the part which is in contact with the conductive member by the insulation member, the insulation member functions as a dielectric, and thus even when there is a potential difference, the potential difference can be gradually decreased.

Since the electrode holder that holds the capillary electrodes is connected to the high-voltage unit, the electrode holder has a high potential. Accordingly, as long as the electrode holder and the conductive member are in contact with each other by the insulation member, even when a high voltage is applied to the capillary through the electrode, the potential can be gradually lowered.

For example, when a sufficient creeping distance or spatial distance is provided between the electrode holder and the low potential structure, discharge does not occur therebetween. In a case where a sufficient distance is not secured for size reduction, it is considered to provide an insulation member therebetween. However, when a gap is formed between the insulation member and the electrode holder or the low potential body, discharge occurs in the gap. This is because, in a case where the insulation member is used as a dielectric, the potential gradient gradually drops in the dielectric; however, the potential gradient is rapid between the insulation member and the gap compared to when nothing is provided therebetween, discharge easily occurs. Accordingly, it is desirable that the electrode holder and the conductive member are in continuous contact with a single insulation member or a plurality of insulation members disposed therebetween without a gap.

Since the structure does not have properties as a dielectric in a case where the structure is not an insulation member, the structure does not have a function of gradually decreasing a potential difference. Thus, the structure is constituted of an insulation member of a single layer or a plurality of layers.

Further, for example, in a case where the conductive member is simply a metal plate or deposited metal surface and is not grounded to earth or ground, the conductive member is a metal floating in the air, and thus the potential difference is not decreased and is only maintained at a constant level. In addition, in a case where the conductive member does not exist, the drop point of the high potential of the high-voltage unit is not determined. Then, discharge occurs or the discharge portion is changed according to the surface state of the peripheral parts or a change in distance by driving. Due to this, when the conductive member in the present invention which is at least partially formed of metal and is grounded to a low potential, and a surface including metal grounded to the low potential do not exist, it is difficult to take a countermeasure against discharge.

The present invention is not limited to the above-described embodiments, and includes various modification examples. For example, the above-described embodiments are described in detail for a better understanding of the present invention, and are not necessarily limited to those having all the configurations of the description. In addition, it is possible to replace a part of a configuration of one embodiment with a configuration of another embodiment, and to add a configuration of another embodiment to a configuration of one embodiment. Further, it is possible to perform addition, deletion, and replacement of other configurations with respect to a part of a configuration of each embodiment.

REFERENCE SIGNS LIST

01: capillary cartridge, 02: capillary, 03: support body, 04: heat dissipation body, 05: electrode holder, 06: exposure cell, 07: capillary head, 08: electrode (cathode), 09: grip, 10: electrode holder fixing pin, 11: electrode holder fixing hole, 12: exposure cell fixing frame, 13: exposure cell positioning pin, 14: positioning hole, 15: electrode holder positioning pin, 16: electrode holder positioning hole, 20: autosampler unit, 21: sampler base, 22: X-axis drive body, 23: Y-axis drive body, 24: Z-axis drive body, 25: sample tray, 26: sample container, 27: liquid feeding mechanism, 28: electrophoresis medium container, 29: anode side buffer liquid container, 30: anode side washing bath, 31: anode side electrophoresis buffer liquid bath, 32: anode side sample introduction buffer liquid bath, 33: cathode side buffer liquid container, 34: waste liquid bath, 35: cathode side washing bath, 36: cathode side electrophoresis buffer liquid bath, 40: irradiation detection/thermostatic bath unit, 41: thermostatic bath unit, 42: irradiation and detection unit, 43: thermostatic bath door, 44: electrode (anode), 50: attachment surface, 51: clip, 60: heater assembly, 61: thermal insulation material, 62: resistance heater, 63: conductive member, 64: heat-dissipating rubber, 65: electrode plug, 66: earth plate, 67: thermostatic bath base, 70: chamfering, 80: one insulation material, 81: two insulation materials, 82: three insulation materials, 90: conductive heat storage plate, 100: non-conductive heat storage plate

The invention claimed is:

1. A capillary electrophoresis apparatus for analyzing a sample by electrophoresis using a capillary, the apparatus comprising:
    a heater that heats the capillary;
    an electrode holder that holds capillary electrodes of the capillary and is connected to a high-voltage unit; and
    a conductive member that is at least partially formed of metal and is grounded to a low potential, wherein
    the electrode holder holds a cathode therein,
    both the electrode holder and the conductive member are in direct contact with a structure disposed therebetween,
    the structure is a rubber, and
    a shape of the structure is complementary to an entirety of: i) a shape of the electrode holder, and ii) a shape of the conductive member.

2. The capillary electrophoresis apparatus according to claim 1, wherein
    the conductive member is subjected to insulation treatment.

3. The capillary electrophoresis apparatus according to claim 2, wherein
    the insulation treatment of the conductive member is performed according to a distance from the electrode holder.

4. The capillary electrophoresis apparatus according to claim 1, wherein
    the capillary and the conductive member are in continuous contact with the structure disposed therebetween.

5. The capillary electrophoresis apparatus according to claim 1, wherein
    the structure is constituted of a single layer or a plurality of layers.

6. The capillary electrophoresis apparatus according to claim 1, wherein
    the conductive member has an area larger than an area of a member to which a high voltage is applied by the capillary electrode.

7. The capillary electrophoresis apparatus according to claim 1, wherein
    the conductive member is chamfered.

8. The capillary electrophoresis apparatus according to claim 1, wherein
    the conductive member is constituted of a conductive heat storage plate.

9. The capillary electrophoresis apparatus according to claim 1, wherein
    a non-conductive heat storage plate is arranged between the conductive member and the structure.

10. A capillary electrophoresis apparatus for analyzing by electrophoresis using a capillary, the apparatus comprising:
    a heater that heats the capillary;
    an electrode holder that holds capillary electrodes of the capillary and is connected to a high-voltage unit; and
    a conductive heat storage plate that is at least partially formed of metal and is grounded to a low potential, wherein
    the electrode holder and the conductive heat storage plate are in direct continuous contact with a single structure or a plurality of structures disposed therebetween,
    the entire structure is an insulation member, and
    a shape of the entire structure is complementary to an entirety of: i) a shape of the electrode holder, and ii) a shape of the conductive heat storage plate.

* * * * *